June 1, 1965   D. H. WARD   3,186,755
KNOCKDOWN VEHICLE BODY
Filed Aug. 13, 1963   2 Sheets-Sheet 1

INVENTOR
David Henry Ward

BY Birch and O'Brien
ATTORNEYS

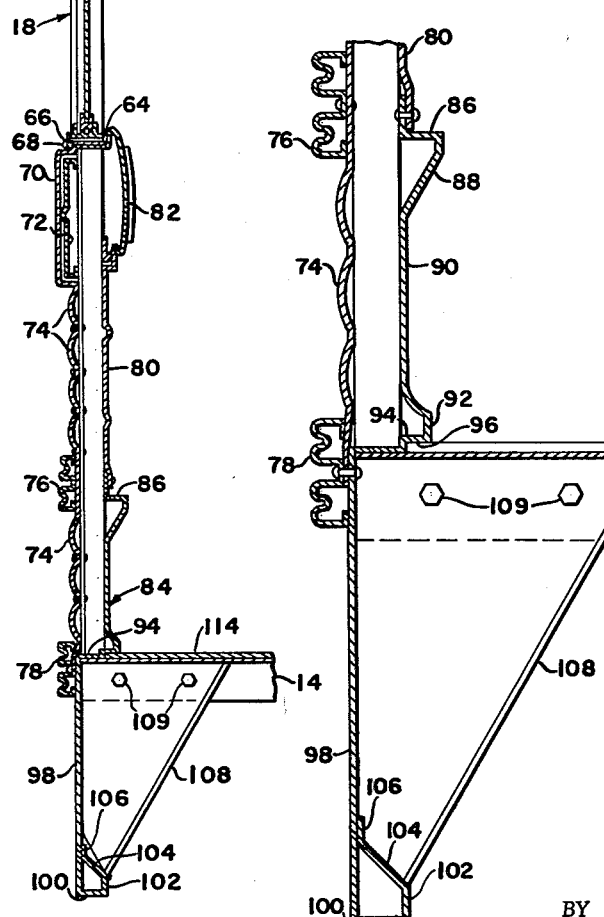

United States Patent Office 3,186,755
Patented June 1, 1965

3,186,755
KNOCKDOWN VEHICLE BODY
David H. Ward, P.O. Box 311, 1912 Caldwell St.,
Conway, Ark.
Filed Aug. 13, 1963, Ser. No. 301,861
5 Claims. (Cl. 296—28)

This invention relates to vehicle bodies and in particular to a vehicle body of the knockdown type.

Knockdown vehicle bodies of the conventional type have many disadvantages particularly with regard to the need of a skilled mechanic to assemble the body and with regard to bulkiness of the knockdown unit.

In accordance with the present invention, the vehicle body is of such a compact nature that it is easily shipped in a knockdown condition to a distant place for assembly purposes. Furthermore, the simplicity of the knockdown unit permits the vehicle body to be rapidly assembled by unskilled labor.

It is, therefore, an object of this invention to construct a vehicle body of simple, compact knockdown units that are easily and accurately assembled in a rapid manner.

Another object of this invention is to provide simple fastening means for a quickly assembled vehicle body.

This invention has another object in that the means for connecting the various panels of a vehicle define interior and exterior trim for the vehicle.

It is another object of the present invention to form an interior and exterior portion of a vehicle panel from a single unitary strip.

Another object of the present invention is to utilize a unitary interior and exterior panel of vehicle as a retainer for the vehicle floor covering.

This invention has another object in that an interior panel of a vehicle is extended to the exterior to serve as a mud splash guard.

This invention has another object in that the rub rail of a vehicle body panel is utilized to cover the connecting seam between adjacent panel portions.

It is a further object of the present invention to include a rain drip mold as a part of the means for connecting the roof panel of a vehicle body with the side panel thereof.

This invention is characterized in that a vehicle body for buses and the like include a floor panel, a roof panel, side panels disposed between the floor and roof panels, and connector means including screw threaded fasteners define a quick knockdown or assembly technique that does not require skilled labor. The body side panels are provided with reinforcement plates which are secured to the floor panel beams by nut and bolt fasteners. Each side panel of the body includes an interior portion integrally formed with an exterior portion; the interior portion presents a finished panel lining or kick skirt inside the vehicle and the exterior portion presents a finished skin outside the vehicle to serve as a splash guard for water, mud, etc.

Additional objects and advantages of the present invention will become apparent from the following description in connection with the accompanying drawings wherein:

FIGURE 2 is a sectional view taken along line II—II of FIGURE 1;

FIGURE 3 is an enlarged, partial section view of a detail of the upper portion of FIGURE 2;

FIGURE 4 is an enlarged, partial section view of a detail of the lower portion of FIGURE 2; and FIGURE 5 is an enlarged, perspective view of FIGURE 4 with parts in section.

Figure 1:
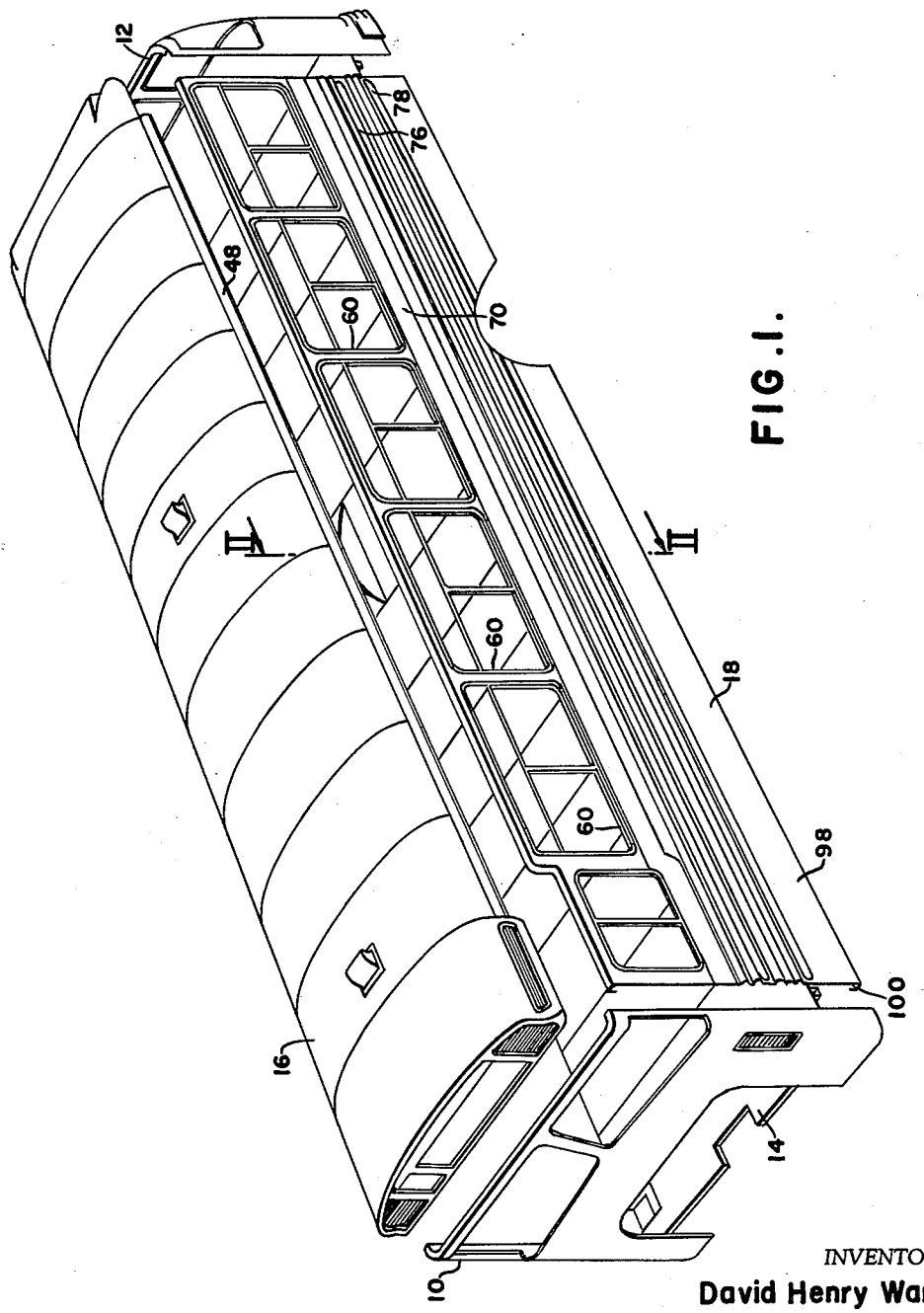
FIGURE 1 is an exploded perspective view of a knockdown bus body embodying the present invention.

A vehicle body according to the present invention as illustrated in FIGURE 1 embodies a plurality of prefabricated metal frame members including front and rear panels 10 and 12, respectively, a floor panel 14, a roof panel 16 and a pair of side panels 18 which are of mirror image construction. It is apparent from the drawing that the prefabricated frame members may be easily nested or stacked into a unitary shipping assembly. The two side panels 18 are reversely nested and placed on the floor panel 14, the front and rear panels 10 and 12 are stacked on the nested side panels, and the roof panel 16 covers the stack whereby the entire stack may be bound into a unitary shipping assembly as by suitable strapping.

The roof panel 16 is easily assembled to each side panel 18 by top connector means as is illustrated in FIGURES 2 and 3. The roof panel 16 includes a curved portion having an exterior wall member 20 and an interior wall member 22. The top connector means has three parts of which the first part 24 is an elongated top channel generally L-shaped in cross section and having an upper inclined tab 26 which is securely fastened to the roof wall 22 as by screws 28. The lower portion of channel 24 is generally U-shaped in cross section formed by a lower inclined tab 30 which is securely fastened to the inside of the roof wall 20 as by screws 32. The second part of the top connector means is a molding strip 34 having a horizontal plate 36, which abuts and is secured to the horizontal strip of the channel 24 as by nut and bolt fasteners 38; the inner end of the plate 36 has a rounded or curved facing 40 terminating in a perpendicularly bent attachment ear 42 securely fastened as by screws 44 to one leg of a U-shaped frame spacer 46. The third part of the top connector means is an exterior molding strip 48 having an upper tab 50 secured to that portion of the exterior roof wall 20 which is sandwiched between the tabs 30 and 50 by the screws 32. The strip 48 has an intermediate portion 52 curved outwardly to serve as a rain drip molding; the bottom of curved portion 52 is everted and integrally joined to an inverted U-shaped channel element 54 with one leg thereof abutting a leg of the channel 46. The two abutting legs of the two channels 46 and 54 are securely fastened as by screws 56 which also provide an attaching means for the flanges 58 of window frame mountings 60.

The upper portion of each side panel 18 includes a plurality of spaced window frames 62 which may be of any conventional type such as side sliding panes or double hung sash frames. The window frame mountings 60 are supported on a horizontal flange 64 integrally formed with the outside skin portion 66 of the panel 18 and are secured thereto as by screws 68. Immediately below the window frame mountings, the outside skin 66 is provided with an offset 70 which defines an internal recess for housing a service conduit 72 for vehicle service lines such as electric wiring, water tubes, pneumatic lines, etc. Below the offset 70, the outside skin 66 has a corrugated appearance defined by a plurality of vertically spaced, elongated rib elements 74. The outside skin 66 is also provided with horizontally extending rub rail sets 76 and 78 which are vertically spaced from each other.

An interior skin portion 80 of the panel 18 is attached at its upper end to the horizontal flange 64 by means of a fastener 82 in the form of an elongated hook and clasp. The lower edge of skin 80 is offset to form a recess for the insertion and connection of the upper end of a kick skirt or lining 84. As is illustrated in FIGURES 4 and 5, the skirt lining comprises an integral strip for both the inside and the outside of the panel 18. Adjacent the recessed connection with the interior skin 80, the inside lining strip 84 is bent perpendicularly to define a horizontal ledge 86 from which an inclined surface 88 leads to a flush wall 90. The lower part of wall 90 curves outwardly to a vertical strip 92 which is joined with a horizontal strip 94 having an offset intermediate its ends to define a flooring recess 96, on its inner end. The outer end of the horizontal strip 94 is integrally formed with a vertical strip defining the outside lining strip 98, the upper end of which is attached to the lower end of the outside skin 66 by the same fastener for the lower rub rail 78 that covers the attachment. The outside lining strip 98 defines a mud splash guard and is integrally formed with an inwardly bent horizontal strip 100 leading to an upwardly spaced vertical strip 102 terminating in an inclined strip 104 that has an attaching end 106 secured to the inner surface of the strip 98. A generally triangular reinforcement or gusset plate 108 extends along the inner surface of the strip 98 with its upper edge attached to the beams of the floor 14 as by nut and bolt fasteners 109 and its lower edge secured to the inclined strip 104 as by welding 110.

As is illustrated in FIGURE 5, the horizontally extending strips of the side panels 18 are fastened as by rivets to a plurality of channel beams 112 (only one being shown), which have a flanged U-shaped configuration. The beams 112 are horizontally spaced along the vehicle so as to be located between the window frame mountings 60. Each beam 112 has a generally U-shape configuration so as to present supporting surfaces to each side panel 18 and the roof panel 16.

It should be noted that the lower interior wall 84, the flooring recess 96 and the exterior splash guard are formed as an integral unit from a single strip of metal to facilitate economical manufacture and to provide additional strength to the frame. The same integral strip provides retaining means for a floor covering 114 in the forms of tile, linoleum, etc. Inasmuch as the floor covering 114 may be installed on the floor panel 14 before the side panels are attached, such installation is performed in an accurate and rapid manner because of the lack of interfering structural members.

In accordance with the present invention, the knocked down vehicle body may be shipped to a distant place as a stacked unit. The stacked unit includes the flanged, U-shaped channels 112 in sufficient number to provide rigidity and strength to the vehicle body as determined by design calculations. For example, two channels 112 may be used, one adjacent the front panel 10 and the other adjacent the rear panel 12 with the frame channels 46 (FIGURE 3) extending therebetween, one for each side panel 18.

Assembly of the unit is easily performed by unskilled labor by the simple manner of attaching the two side panels 18 to the opposite sides of the floor panel 14 by the nut and bolt fasteners 109; the gusset plate 108 has a suitable flange for attachment to a flange of the channel 112 so that the channel 112 and gusset plates 108 may be fastened together prior to shipment or may be fastened at the assembly site as desired. It should be noted that adjacent edges of the flanges of channel 112 and the strip 106 as well as the adjacent edges of the gusset plate 108 and inclined strip 104 are all in close fitting abutting relation so that the welding seam 110 is not a necessary element of the assembly. The next assembly step comprises fastening the roof panel 16 to the tops of each side panel 18 by the top connector means. The front and rear panels 10 and 12 may then be secured to the assembly by any suitable fastening means.

Inasmuch as the present invention is subject to many modifications, variations and changes in structural details, it is intended that all matter contained in the foregoing description and shown on the accompanying drawings shall be interpreted as illustrative and not in a limiting sense.

What is claimed is:

1. In a vehicle body for buses and the like, the combination comprising a roof panel, a floor panel, a pair of side panels disposed between said roof and floor panels, connector means connecting said roof panel to said side panels and including first, second and third parts, said first part having spaced vertical strips and a horizontal strip therebetween, one of said vertical strips defining interior trim for said vehicle body, said second part having horizontal and vertical strips and a curved strip therebetween, said curved strip defining interior molding for the vehicle body, said third part having upper and lower attaching strips and an intermediate strip therebetween, said intermediate strip being curved to define a rain drip molding for the exterior of the vehicle body, said upper attaching strip and the other of said vertical strips being secured to said roof panel, said lower attaching strip and the vertical strip of said second part being secured to an adjacent side panel, means fastening together the horizontal strips of said first and second parts, each of said side panels including an upper window frame portion and a lower body portion, said lower body portion having exterior and interior strips extending along the length of the vehicle and having a combined exterior and interior strip integrally formed as a single strip and being connected to said strips, and means fastening said combined exterior and interior strip to said floor panel.

2. The combination as recited in claim 1 wherein said combined exterior and interior strip comprises an interior kick skirt vertically disposed above an adjacent part of said floor panel, a horizontal portion overlying the adjacent part of said floor panel, and an exterior skirt vertically disposed below the adjacent part of said floor panel to define a mud splash guard.

3. The combination as recited in claim 2 wherein said horizontal portion includes offset means defining a recess, and floor covering means on said floor panel has edge portions received in said recess to retain said floor covering means.

4. The combination as recited in claim 2 wherein said fastening means includes gusset plate means disposed between an inner surface of said mud splash guard and an undersurface of said floor panel.

5. The combination as recited in claim 2 wherein said exterior strip has a lower edge terminating adjacent the top of said mud splash guard to define a connecting seam therebetween, and a rub rail covering the connecting seam.

References Cited by the Examiner

UNITED STATES PATENTS

| | | | |
|---|---|---|---|
| 1,883,991 | 10/32 | Ledwinka | 296—28 |
| 2,029,756 | 2/36 | Davis | 296—28 |
| 2,250,523 | 7/41 | Christiansen et al. | |
| 2,355,794 | 8/44 | Gentry | 296—27 |
| 2,382,376 | 8/45 | Black | 296—28 X |
| 2,504,657 | 4/50 | Dean. | |
| 2,735,714 | 2/56 | Dean et al. | 296—28 |
| 2,862,760 | 12/58 | Davis | 296—28 |
| 3,027,187 | 3/62 | Rivers | 296—28 |

FOREIGN PATENTS 441,098   1/36   Great Britain.

A. HARRY LEVY, *Primary Examiner.*